United States Patent [19]

Kim

[11] Patent Number: 5,538,295
[45] Date of Patent: Jul. 23, 1996

[54] NIPPLE FOR A VEHICLE WASHER PUMP

[75] Inventor: In K. Kim, Kyungki-do, Rep. of Korea

[73] Assignee: Dong Yang Industrial Company, Ltd., Rep. of Korea; a part interest

[21] Appl. No.: 293,805

[22] Filed: Aug. 22, 1994

[30] Foreign Application Priority Data

Jan. 8, 1994 [KR] Rep. of Korea .................. 94-219

[51] Int. Cl.⁶ ............................................. F16L 31/00
[52] U.S. Cl. ........................................ 285/239; 15/250.01
[58] Field of Search .............................. 285/239, 177; 15/250.02, 250.01

[56] References Cited

U.S. PATENT DOCUMENTS 3,078,493  2/1963  Ryck et al. .................. 15/250.02
3,503,090  3/1970  Romanowski .............. 15/250.02
3,767,233  10/1973 Hodge ........................... 285/239
3,799,704  3/1974  Kuck ......................... 15/250.02 X
4,257,629  3/1981  Maple et al. ................. 285/177 X

*Primary Examiner*—Richard E. Gluck
*Attorney, Agent, or Firm*—Nathan N. Kallman

[57] ABSTRACT

This invention relates to nipples, an inlet nipple 2 and an outlet nipple 3, for a washer pump to squirt washer fluid onto a windshield of a vehicle. The respective nipples 2, 3 include a first connecting portion 4, 4a and a second connecting portion 5, 5a so that two kinds of conduits 8, 8a having different inner diameters can be selectively connected to the first connecting portion 4, 4a or the second connecting portion 5, 5a. The connecting portions include an annular rib 6, 7 on their peripheries to seal the clearance between the nipples 2, 3 and the respective conduits 8, 8a connected to them.

1 Claim, 2 Drawing Sheets

NIPPLE FOR A VEHICLE WASHER PUMP

FIELD OF THE INVENTION

The present invention relates to a nipple for a vehicle washer pump and more specifically to a nipple adaptable to two kinds of conduits having different diameters.

DESCRIPTION OF PRIOR ART

A vehicle washer pump is used to squirt washer fluid onto a windshield.

Generally, such a washer pump has two nipples, i.e. an inlet nipple which is connected with one end of a conduit extending from a washer fluid reservoir and delivers washer fluid from the reservoir to the inside of pump and an outlet nipple which delivers washer fluid under pressure in the pump to a nozzle through a conduit.

The washer pump as mentioned above is disclosed in U.S. Pat. Nos. 3,799,704, 3,078,493 and 3,503,090.

However, the nipples of all the conventional washer pumps have diameters adaptable to only either one of two different conduit diameters, 5 mm or 7 mm inner diameter, generally supplied to the market. Therefore, two kinds of washer pumps having different nipple diameters must be produced for each size of the conduit.

It is undesirable that two kinds of washer pumps must be respectively produced for each one of two different conduit diameters.

Furthermore, in case that a nipple of a washer pump is connected with a conduit larger in size, a leakage will occur between the nipple and the conduit. This leakage will cause the injection force of the pump to be reduced.

SUMMARY OF THE INVENTION

In accordance with this invention, a washer pump having an inlet nipple and an outlet nipple which have two-stepped outer diameters of the periphery. The outer periphery of each nipple has annular ribs so that either one of two different sizes of conduits may be tightly connected to the nipples.

DETAILED DESCRIPTION OF THE INVENTION

Figure 1:
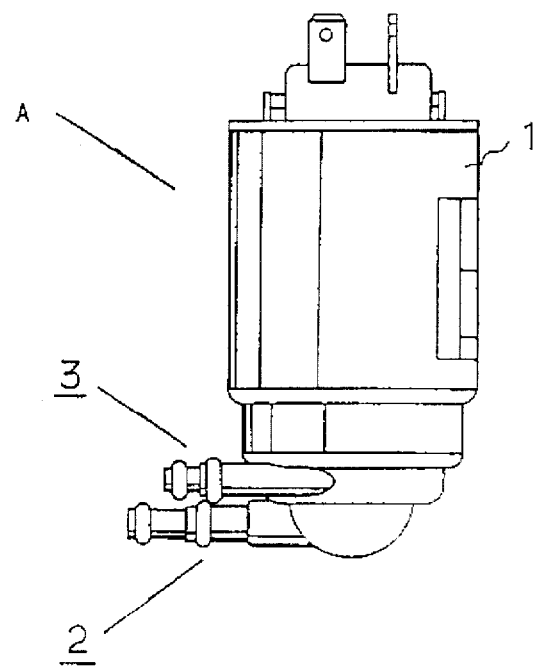
FIG. 1 is a side view of a washer pump according to the invention.

FIG. 1 illustrates a preferred embodiment of the present invention wherein a windshield washer pump 9 having an inlet nipple 2 and an outlet nipple 3 are shown at the lower end of the body 1.

Figure 2:
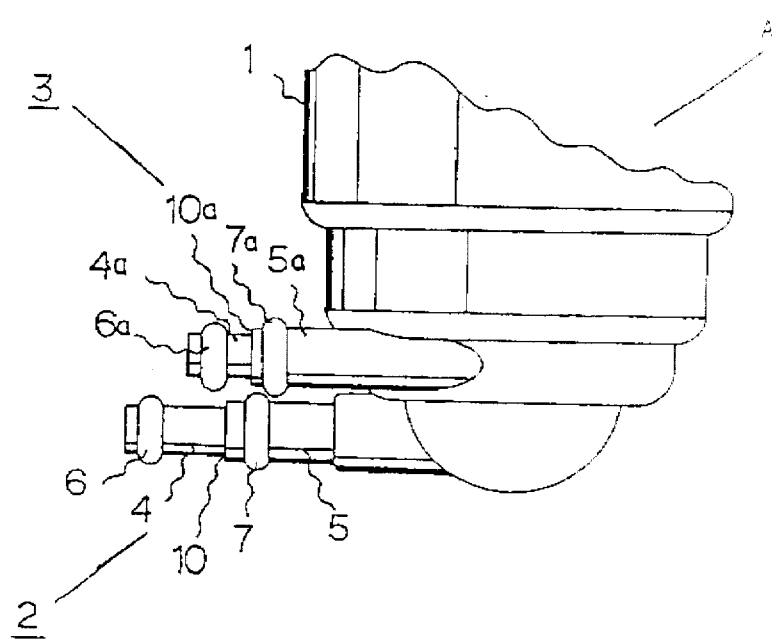
FIG. 2 is an enlarged side view in part of the washer pump of FIG. 1.

As shown in FIG. 2, each nipple 2, 3 comprises respectively a first connecting portion 4, 4a formed at the front and a second connecting portion 5, 5a formed coaxially with and larger than the first connecting portion 4, 4a in the outer diameter.

Annular ribs 6, 6a, 7, 7a are provided on the outer periphery of each connecting portion 4, 4a, 5, 5a respectively to seal the connection between the outer periphery of the connecting portion 4, 4a, 5, 5a and conduits 8.

Figure 3:
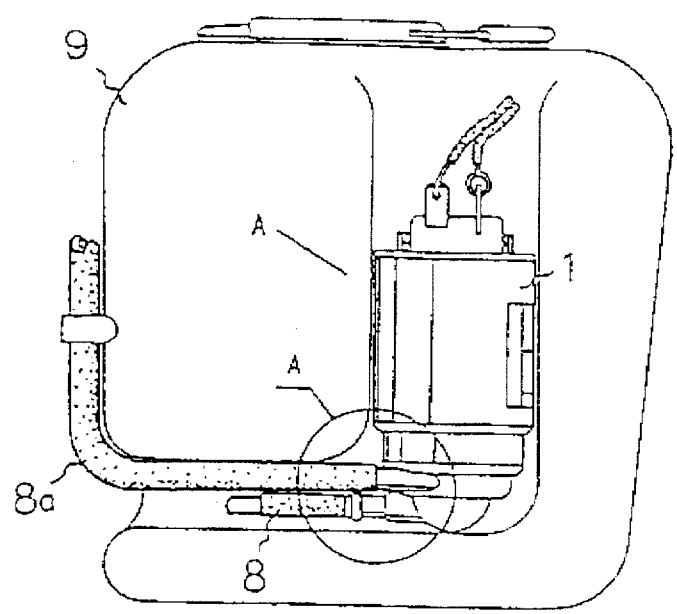
FIG. 3 is a side view showing the nipples of the invention connected with the conduits for delivering washer fluid.
Figure 4:
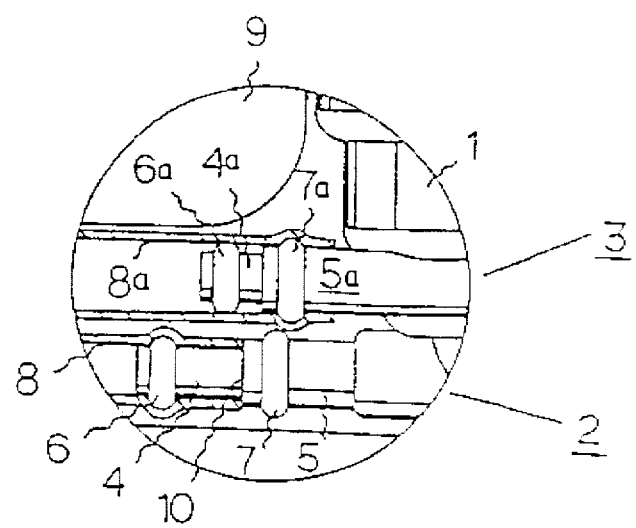
FIG. 4 is an enlarged view of the "A" portion in FIG. 3.

The smaller conduit 8, 8a as illustrated in FIGS. 3 and 4, is adapted to be connected with the connecting portion 4, 5 of the inlet nipple 2, and the larger conduit 8a with the connecting portions 4a, 5a.

When the conduits 8, 8a are connected with the connecting portions 4, 4a, 5, 5a, the annular ribs 6, 6a, 7, 7a seal the connection between the conduits 8, 8a and the connecting portions 4, 4a, 5, 5a without leakage.

As the two kinds of outer diameter are provided with each nipple of the washer pump according to the present invention, either one of the two different sizes of conduits may be connected to either nipple without leakage by means of the annular ribs.

Therefore, it is not necessary that a manufacturer produces two kinds of washer pumps which are different only in nipple size.

What is claimed is:

1. Nipples for a vehicle washer pump comprising:

an inlet nipple (2) having a first connecting portion (4) and a second connecting portion (5) coupled to said first connecting portion (4), said second connecting portion having a diameter larger than said first connecting portion;;

an outlet nipple (3) having a first connecting part (4a) and a second connecting part (5a) coupled to said first connecting part (4a), said second connecting part having a diameter larger than said first connecting part;

a first conduit (8) coupled to said first connecting portion (4) of said inlet nipple (2);

a second conduit (8a) coupled to said first connecting part (4a) of said outlet nipple (3), said second conduit (8a) having a larger inner diameter than that of said first conduit (8);

wherein said inlet and outlet nipples each have two-stepped outer diameters of their respective peripheries so that conduits having different inner diameters may be selectively connected to said nipples; and two annular ribs (6), (7), (6a), (7a) encompassing each of said connecting portions (4), (5), and connecting parts (4a), (5a), respectively, whereby clearances between said inlet and outlet nipples and their respective conduits are sealed to prevent leakage.

\* \* \* \* \*